United States Patent [19]

Walker

[11] Patent Number: 4,628,428
[45] Date of Patent: * Dec. 9, 1986

[54] MODULATION CIRCUIT FOR DC-DC CONVERTER WITH R-C OSCILLATOR

[75] Inventor: John D. Walker, Coventry, England

[73] Assignee: The General Electric Company, p.l.c., England

[*] Notice: The portion of the term of this patent subsequent to Dec. 9, 2003 has been disclaimed.

[21] Appl. No.: 671,451

[22] Filed: Nov. 14, 1984

[30] Foreign Application Priority Data

Dec. 23, 1983 [GB] United Kingdom ............... 8334373

[51] Int. Cl.⁴ .......................................... H02M 3/335
[52] U.S. Cl. ...................................... 363/21; 323/288
[58] Field of Search ............... 323/242, 243, 288, 326; 363/21, 89, 95, 97

[56] References Cited

U.S. PATENT DOCUMENTS

| | | | |
|---|---|---|---|
| 4,124,884 | 11/1978 | Episcopo | 363/21 |
| 4,135,233 | 1/1979 | Seiersen | 363/21 |
| 4,504,776 | 3/1985 | Haville | 323/288 |

Primary Examiner—Patrick R. Salce
Assistant Examiner—D. L. Rebsch
Attorney, Agent, or Firm—Kirschstein, Kirschstein, Ottinger & Israel

[57] ABSTRACT

A switched mode power supply in which the power switch (TR1) is modulated by a resistance-capacitance oscillator (COM, R1–R5, CT). During each on-period of the switch (TR1) a secondary winding (WS) of a sense transformer (TX2) develops a unipolar sense voltage which is applied to a capacitor (CT) in the oscillator while it is charging, so as to vary the charging time and hence the on-period, the off-period of the switch (TR1) being constant.

4 Claims, 2 Drawing Figures

MODULATION CIRCUIT FOR DC-DC CONVERTER WITH R-C OSCILLATOR

This invention relates to DC-DC converters.

Converters of this type known as switched-mode power supplies (SMPS) have a d.c. input applied to the primary winding of a transformer (the power transformer) in series with a power switch which is switched on and off at a frequency generated internally in the power supply, and the signal at a secondary winding of the power transformer is rectified and filtered to give a required d.c. output. The output is regulated by variation of the on-off ratio of the power switch, i.e. by pulse-width modulation (PWM).

Various techniques are possible for operating the power switch. For example, it may be operated by the output of a gate circuit which is controlled by a fixed-frequency oscillator co-operating with a latch circuit, the latch circuit being responsive to the comparison of regulation information with fixed information, to vary the on-off ratio of the power switch within that fixed frequency.

An object of this invention is to provide a technique for operating the power switch which is simple and economical in its use of components.

According to the invention there is provided a DC-DC converter in which the primary winding of a sense transformer is in series with the primary winding of a power transformer and a power switch, in which the on-off ratio of the power switch is determined by a rectangular pulse output of a resistance-capacitance oscillator, in which the duration of and the time between pulses in said pulse output respectively correspond to the times taken for a capacitor within the oscillator to charge to and to discharge to respective first and second voltage reference values, in which the sense current in a secondary winding of the sense transformer is used to develop a unipolar sense voltage during each on-period of the power switch, and in which said sense voltage is applied to the capacitor such that the time taken for the capacitor to charge to the first reference voltage value and hence the duration of the on-period of the power switch is variable dependent on the sense current during each said on-period, the time taken for the capacitor to discharge to the second reference voltage value being constant.

The use of a sense transformer having its primary winding in series with the primary winding of the power transformer, whereby the switched current in these two windings is monitored by a sense current in a secondary winding of the sense transformer, the sense current enabling current regulation of the converter output, is known per se. The use of the rising sense current for comparison with a fixed constant level reference signal, which may be termed 'current mode control' has been proposed as a technique to provide pulse-width modulation but has not been commonly adopted.

The basic idea of this invention is, using the sense current, to incorporate the modulation function into the oscillator whose output can then directly control the power switch.

According to a feature of the invention described in the penultimate paragraph, the current in the primary winding of the sense transformer is dependent on the d.c. output current of the converter whereby current regulation of the converter output is provided via said sense current, a further winding of the sense transformer and a rectifier are connected in a series path which is in parallel with a secondary winding of the power transformer such that unipolar current in said further winding is switched synchronously with the current in the primary winding of the sense transformer and said sense current is dependent on the current in said further winding in addition to the current in the primary winding of the sense transformer, and means are provided to derive a voltage error signal from the d.c. output voltage of the converter and to vary the amplitude of the switched current in said series path including said further winding responsive to the voltage error signal, whereby voltage regulation of the converter output is also provided via said sense current.

In the feature of the invention just described the further winding of the sense transformer is provided as a reliable and economic means for producing isolated feedback of an output voltage error signal using the sense transformer as a current summing transformer. There are thus effectively two feedback loops, a current regulation feedback loop and a voltage regulation feedback loop, with one embedded in the other.

A DC-DC single-ended forward converter in accordance with the invention will now be described in detail with reference to the accompanying drawing, in which.

Figure 1:
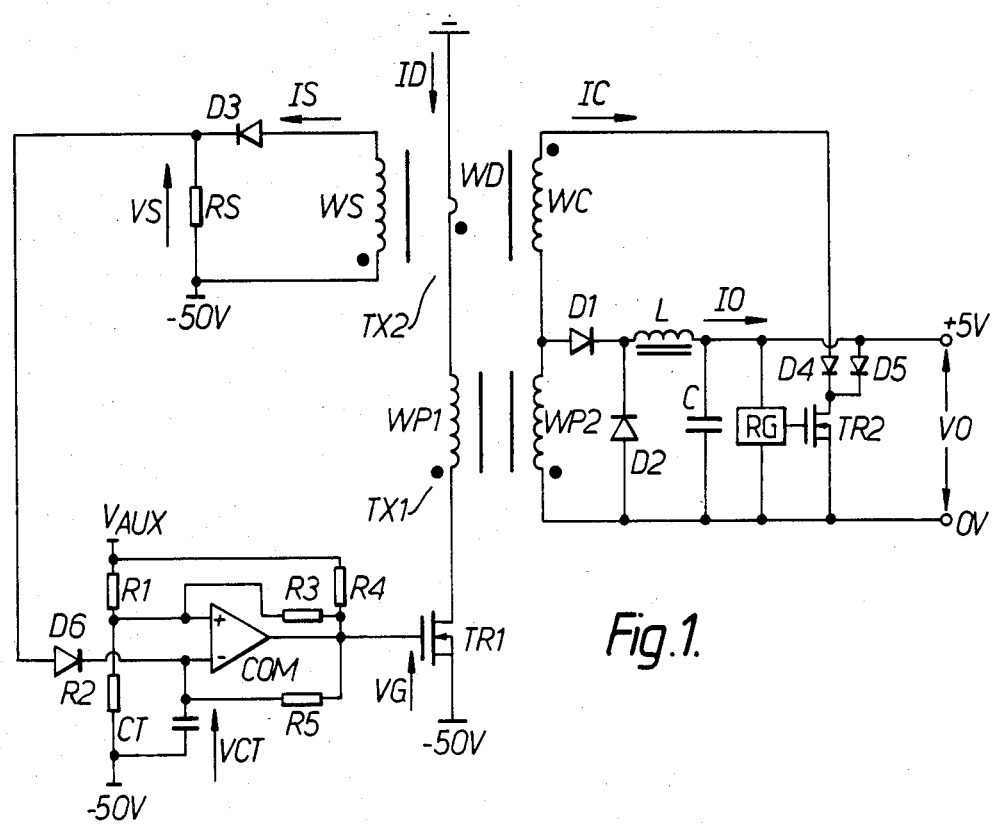
FIG. 1 is a circuit diagram of the converter.
Figure 2:
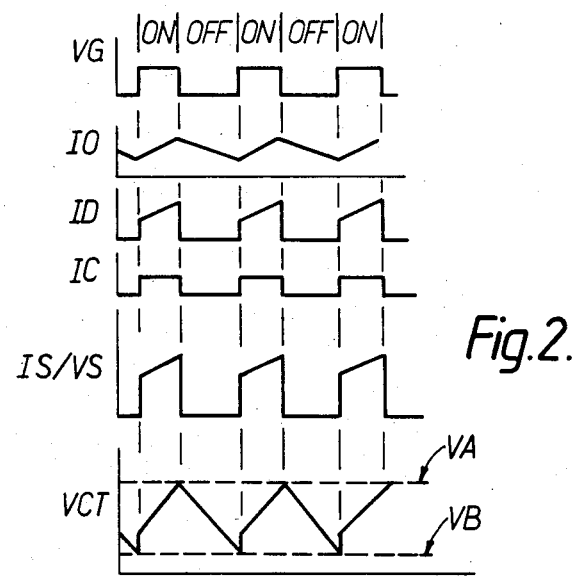
FIG. 2 shows current and voltage waveforms at various parts of the circuit of FIG. 1 in a steady state condition.

Referring now to the drawing, the circuit includes the basic topology of a single-ended forward converter type of switched mode power supply suitable for producing a +5 volt d.c. output supply for computer circuits from a −50 volt d.c. input supply derived from a telephone system. This basic topology consists of a power transformer TX1 having its primary winding WP1 connected in series with a power switch TR1 (shown as a field effect transistor) and the −50 volt d.c. input supply, the secondary winding WP2 of the transformer TX1 being connected to the rectifying diodes D1 and D2 and the filtering and smoothing inductor L and capacitor C to produce the +5 volt d.c. output supply VO. The power switch TR1 is turned on and off by the rectangular pulse output voltage VG of a resistance-capacitance oscillator which includes a comparator COM, the on-off ratio being responsive to information fed back from the output of the converter in the manner to be described.

The basic configuration of the resistance-capacitance oscillator is as follows. Two resistors R1 and R2 are connected across a supply voltage between a potential $V_{AUX}$ and −50 volts. The junction of the resistors R1 and R2 is connected to one input of the comparator COM, a resistor R3 is connected between that input and the output of the comparator COM, and a resistor R4 is connected between the output of the comparator COM and one end $V_{AUX}$ of the supply voltage. A resistor R5 is connected between the output of the comparator COM and its other input, and a capacitor CT is connected between that other input and the other end −50 V of the supply voltage.

$V_{AUX}$ is suitably +12 volts relative to −50 volts and can be derived from the main −50 volt d.c. input supply, for example by a 12 volt zener diode and resistor connected across the main supply, a transistor buffer and a local decoupling capacitor. These components for deriving $V_{AUX}$ are not shown.

The dimensions of the components forming the resistance-capacitance oscillator as described above determine its basic output voltage waveform VG. An upper voltage reference value VA and a lower voltage reference value VB are established. The duration of pulses in which the output VG is at substantially the potential $V_{AUX}$, and the power switch TR1 is turned on, corresponds to the time taken for the voltage VCT across the capacitor CT to charge to the upper voltage reference value VA. The time between these pulses in which the output voltage VG is at substantially −50 volts, and the power switch TR1 is turned off, corresponds to the time taken for the voltage VCT across the capacitor CT to discharge to the lower voltage reference value VB. In the absence of information fed to the comparator COM via the diode D6, the "on" and "off" times of the power switch TR1 determined by the output VG would be equal and the oscillator would operate at its basic frequency, for example 100 KHZ, which determines the basic operating frequency of the converter.

A sense transformer TX2 has a primary winding WD connected in series with the primary winding WP1 of the power transformer TX1, the power switch TR1 and the −50 volt d.c. input supply. As shown, the windings WD and WP1 and the switch TR1 carry a current ID. A secondary winding WS of the sense transformer TX2 carries a sense current IS which, via a rectifying diode D3, develops a unipolar voltage VS across a sense resistor RS relative to −50 volts connected to one end of the resistor RS.

The sense voltage VS is applied via the diode D6 to the capacitor CT. When the power switch TR1 is turned on, the current ID is turned on and rises at a certain rate determined by the inductance of the circuit. The initial value of the current IS and hence the voltage VS at the beginning of each 'on' period instantaneously charges the voltage VCT on the capacitor CT to an initial value which is arranged to be between the two voltage reference values VA and VB. The voltage VCT on the capacitor CT then rises at a rate determined both by rate at which the voltage VS rises and by the rate at which the capacitor CT would normally charge as determined by the components of the resistance-capacitance oscillator. When the voltage VCT reaches the voltage reference value VA, the output VG of the comparator switches to turn off the power switch TR1 and hence also to turn off the sense voltage VS. The capacitor CT then discharges to the voltage reference value VB, with the diode D6 being reverse biassed, at the rate determined solely by the resistance-capacitance oscillator components. The duration of the "on" period of the power switch TR1 is thus variable, dependent on the sense current during each "on" period, whereas the "off" period of the power switch TR1 is not influenced by the sense current and is constant.

A further winding WC of the sense transformer TX2 and a rectifying diode D4 are connected in a series path with a field effect transistor TR2, the series path being connected in parallel with the secondary winding WP2 of the power transformer TX1 such that the further winding WC carries a unipolar current IC which is switched synchronously with the current ID in the primary winding WD of the sense transformer TX2.

A regulator RG includes a voltage reference device supplying a constant voltage of 1.2 volts and an error amplifier which compares this constant voltage with a fraction of the 5 volt converter output voltage VO to produce a voltage error signal which varies the amplitude of the switched current IC via the transistor TR2. The voltage error signal is arranged in such a phase that if the amplitude of the converter output voltage VO increases, then the amplitude of the current IC also increases. A diode D5 provides current through the transistor TR2 during the 'off' periods of the current IC in the further winding WC, to prevent switching effects from being injected onto the output of the regulator RG.

The sense transformer TX2 is a current summing transformer according to the equation $$IS \times NS = ID \times ND + IC \times NC$$

where NS, ND and NC are the number of turns in the windings WS, WD and WC respectively and the windings are poled in the relationship according to the dot notation shown in the drawing.

The current and voltage waveforms shown in the drawing illustrate a steady state of operation of the circuit, that is, where there is a constant input voltage and a constant load. Under these conditions the current IC and the on-off ratio of the power switch TR1 will adjust to whatever values are necessary to maintain the required output voltage of the converter.

The above-defined ampere-turns and hence current summing equation and the steady state waveforms shown in the drawing enable the essence of the 'current mode' control provided by the circuit to be understood. Thus if, at the beginning of the 'on' period of a given cycle of the power switch TR1, the amplitude of either the current ID or the amplitude of the current IC is increased compared with its value in the previous cycle, then the initial amplitude of the current IS and hence the voltage VS is correspondingly increased, the voltage VCT will reach the reference voltage VA correspondingly earlier and the duration of the 'on' period of the power switch TR1 will be correspondingly reduced.

The output current IO of the converter, that is the current through the inductor L, rises during the 'on' period of the power switch TR1 and falls during the 'off' period of the power switch TR1. There is thus a small a.c. component in what is essentially a d.c. current output. The current ID through the power switch TR1 is proportional to the output current IO. Thus if the current IO suddenly starts at a higher amplitude at the beginning of the 'on' period of a given cycle of the power switch compared with its value in the previous cycle, then the amplitude of the current ID is proportionly increased and therefore so is the current IS with the result that this 'on' period is terminated earlier than in the previous cycle and immediate correction of the peak value and hence also the average d.c. value of the output current IO is provided. Thus current protection and regulation of the converter output is provided on a fast cycle by cycle basis by a first feedback loop with galvanic isolation via the sense transformer TX2.

The basic topology of the single-ended forward converter, as described at the beginning of the description with reference to the drawing, is such that the output current IO does not fall to zero during the 'off' period of the power switch TR1 and the converter exhibits a very low open loop d.c. output impedance and hence essentially good voltage regulation. Thus changes in the load will not produce large or fast changes in the on-off ratio of the power switch TR1. However, fine control of the output voltage is provided slowly over a number of cycles by change in the voltage error signal produced by the regulator RG producing a small change in the current IC and hence a small change in the on-off ratio per cycle. Thus this fine control voltage regulation of the converter output is provided by a second feedback loop with galvanic isolation via the sense transformer TX2.

There are thus effectively two feedback loops, with one embedded in the other.

The whole converter circuit shown in the drawings and described above can be considered as a voltage controlled current source. That is to say that it essentially provides a constant current, but that current is adjusted by the voltage error signal in order to produce a constant voltage.

In a simplified alternative arrangement to that shown in the drawings and described above, non-isolated feedback of the voltage error signal produced by the regulator RG may be provided. In this case the further winding WC of the sense transformer TX2, the diodes D4 and D5 and the transistor TR2 may be omitted, and the output of the regulator RG may be directly connected in series with sense resistor RS. In this case the sense voltage VS will still be a unipolar voltage but will be responsive solely to the current ID, and the voltage error signal will be continuous voltage which will add to the sense voltage VS. Thus, as with the arrangement shown in the drawings, the sense voltage VS will be applied to the capacitor CT such that the time taken for the capacitor CT to charge to the reference voltage VA and hence the duration of the "on" period of the power switch TR1 will be variable dependent on the sense current IS during each "on" period. However, in this alternative arrangement this response to the sense current IS will only be effective for current regulation of the converter output. Voltage regulation of the converter output will be achieved by the additional application of the output voltage error signal to the capacitor CT during each "on" period of the power switch TR1. The time taken for the capacitor CT to discharge to the reference voltage VB, i.e. the "off" period of the power switch TR1, will again be constant.

I claim:

1. A DC-DC converter in which the primary winding of a sense transformer is in series with the primary winding of a power transformer and a power switch, in which the on-off ratio of the power switch is directly controlled by a rectangular pulse output of a resistance-capacitance oscillator, in which the duration of and the time between pulses in said pulse output respectively correspond to the times taken for a capacitor within the oscillator to charge to and to discharge to respective first and second voltage reference values, in which the sense current in a secondary winding of the sense transformer is used to develop a unipolar sense voltage during each on-period of the power switch, in which said sense voltage is applied to the capacitor such that the time taken for the capacitor to charge to the first reference voltage value and hence the duration of the on-period of the power switch is variable dependent on the sense current during each said on-period, the time taken for the capacitor to discharge to the second reference voltage value being constant, in which said unipolar sense voltage which is applied to the capacitor is applied to one input of a comparator within the oscillator, in which a fixed reference voltage is applied to the other input of the comparator whereby the end of each said on-period is responsive to the output of the comparator which is galvanically connected to the power switch, in which the rising current in the primary winding of the sense transformer during each said on-period is dependent on the d.c. output current of the converter whereby current regulation of the converter output is provided via said sense current, in which a further winding of the sense transformer and a rectifier are connected in a series path which is in parallel with a secondary winding of the power transformer such that said further winding carries a unipolar current which is of constant amplitude during each said on-period and is switched synchronously with the current in the primary winding of the sense transformer, in which error signal means are provided to derive a voltage error signal from the d.c. output voltage of the converter, in which control means to which the voltage error signal is applied are provided in said series path including said further winding so that the constant amplitude of the current in said further winding during each on-period of the power switch is determined by the voltage error signal, and in which the amplitude of the rising said sense current during each said on-period is determined by the additive effect of the constant current in said further winding and the rising current in the primary winding of the sense transformer whereby voltage regulation of the converter output is also provided via said sense current.

2. The DC-DC converter as claimed in claim 1, having the configuration of a single-ended forward converter.

3. The DC-DC converter as claimed in claim 1, suitable for converting a telephone system supply voltage to a computer circuit supply voltage.

4. The DC-DC converter as claimed in claim 2, suitable for converting a telephone system supply voltage to a computer circuit supply voltage.

* * * * *